(12) United States Patent
Zhang et al.

(10) Patent No.: US 9,874,314 B2
(45) Date of Patent: Jan. 23, 2018

(54) RETROFIT ORGANIC LIGHT EMITTING DIODE (OLED) LIGHT SOURCE

(71) Applicant: OLEDWORKS GMBH, Aachen (DE)

(72) Inventors: Ming Zhang, Shanghai (CN); Bo Pan, Shanghai (CN); Lei Sui, Shanghai (CN); Zhong Huang, Shanghai (CN); Gang Wang, Shanghai (CN)

(73) Assignee: OLEDWORKS GMBH, Aachen (DE)

( * ) Notice: Subject to any disclaimer, the term of this patent is extended or adjusted under 35 U.S.C. 154(b) by 213 days.

(21) Appl. No.: 14/779,658

(22) PCT Filed: Mar. 20, 2014

(86) PCT No.: PCT/IB2014/059997
§ 371 (c)(1),
(2) Date: Sep. 24, 2015

(87) PCT Pub. No.: WO2014/155247
PCT Pub. Date: Oct. 2, 2014

(65) Prior Publication Data
US 2016/0084445 A1    Mar. 24, 2016

(30) Foreign Application Priority Data

Mar. 27, 2013    (WO) ................ PCT/CN2013/073283

(51) Int. Cl.
*F21V 33/00* (2006.01)
*F21K 99/00* (2016.01)
(Continued)

(52) U.S. Cl.
CPC .................. *F21K 9/13* (2013.01); *F21K 9/23* (2016.08); *F21K 9/238* (2016.08);
(Continued)

(58) Field of Classification Search
CPC ... F21K 9/13; F21K 9/238; F21K 9/23; F21V 23/006
See application file for complete search history.

(56) References Cited

U.S. PATENT DOCUMENTS 6,787,990 B2    9/2004    Cok
6,819,036 B2    11/2004   Cok
(Continued)

FOREIGN PATENT DOCUMENTS

DE    102011082209 A1    3/2013
EP        1367675 A1    12/2003
(Continued)

*Primary Examiner* — Evan Dzierzynski (57) ABSTRACT

A socket is provided (100, 400) for electrically connecting an OLED blade (300), the socket (100, 400) comprising a first part (110, 410) and a second part (120, 420) with a slot (170, 470) between the first part (110, 410) and the second part (120, 420) for receiving the OLED blade (300), at least parts of the first part (110, 410) or the second part (120, 420) being transparent such that primary light emitted by the OLED blade (300) when inserted in the slot can pass the first part (110, 410) or the second part (120, 420), the socket (100, 400) further comprising first electrical contacts (150) for electrically contacting the OLED blade (300) and a first mechanical fixture (140) to attach the OLED blade (300) in a removable way between the first part (110, 410) and the second part (120, 420), the socket (100, 400) further comprising an electrical connector (130, 430) for supplying electrical power to the first electrical contacts (150). The socket (100, 400) enables a flexible light source by providing an adapter between conventional electrical connectors like screw bases or power outlets and OLEDs (290). Furthermore, single side emitting and double side emitting OLEDs can be used in combination with the socket (100, 400).

15 Claims, 8 Drawing Sheets

(51) Int. Cl.
    *F21V 19/00*         (2006.01)
    *F21V 19/04*         (2006.01)
    *F21V 23/00*         (2015.01)
    *H01L 27/32*         (2006.01)
    *F21K 9/23*          (2016.01)
    *F21K 9/238*         (2016.01)
    *F21Y 105/00*        (2016.01)
    *F21Y 105/10*        (2016.01)
    *F21Y 115/10*        (2016.01)
    *F21Y 115/15*        (2016.01)

(52) U.S. Cl.
    CPC ........ *F21V 19/0045* (2013.01); *F21V 19/045* (2013.01); *F21V 23/003* (2013.01); *F21V 23/006* (2013.01); *H01L 27/32* (2013.01); *F21Y 2105/00* (2013.01); *F21Y 2105/10* (2016.08); *F21Y 2115/10* (2016.08); *F21Y 2115/15* (2016.08); *H01L 2251/5361* (2013.01); *Y02B 20/36* (2013.01); *Y02B 20/383* (2013.01)

(56) References Cited

U.S. PATENT DOCUMENTS

| | | | |
|---|---|---|---|
| 7,728,514 B2 | 6/2010 | Rogojevic et al. | |
| 8,113,685 B2 | 2/2012 | Waumans et al. | |
| 8,227,962 B1 | 7/2012 | Su | |
| 2004/0032727 A1 | 2/2004 | Cok | |
| 2005/0207165 A1 | 9/2005 | Shimizu et al. | |
| 2006/0285361 A1 | 12/2006 | Cok | |
| 2008/0174224 A1 | 7/2008 | Liao et al. | |
| 2009/0168430 A1 | 7/2009 | Hsu et al. | |
| 2010/0220396 A1* | 9/2010 | Kraeuter | C08J 7/12 359/642 |
| 2010/0308353 A1 | 12/2010 | Grabowski et al. | |
| 2012/0236563 A1 | 9/2012 | Breidenassel et al. | |
| 2012/0257397 A1 | 10/2012 | Lee et al. | |
| 2012/0262929 A1 | 10/2012 | Knapp et al. | |
| 2012/0294016 A1* | 11/2012 | Tran | F21S 2/005 362/382 |
| 2013/0044501 A1* | 2/2013 | Rudisill | F21V 29/004 362/398 |
| 2014/0153259 A1* | 6/2014 | Lee | F21K 9/135 362/363 |
| 2014/0293604 A1 | 10/2014 | Diekmann et al. | |

FOREIGN PATENT DOCUMENTS

| | | |
|---|---|---|
| EP | 2500635 A2 | 9/2012 |
| WO | 2012070366 A1 | 5/2012 |
| WO | 2012158725 A1 | 11/2012 |

* cited by examiner

RETROFIT ORGANIC LIGHT EMITTING DIODE (OLED) LIGHT SOURCE

CROSS-REFERENCE TO PRIOR APPLICATIONS

This application is the U.S. National Phase application under 35 U.S.C. §371 of International Application No. PCT/IB2014/059997, filed on Mar. 20, 2014, which claims the benefit of Chinese Patent Application No. PCT/CN2013/073283, filed on Mar. 27, 2013. These applications are hereby incorporated by reference herein.

FIELD OF THE INVENTION

The invention relates to a socket for electrically connecting an OLED blade. The invention further relates to an OLED blade, an OLED blade panel and to a light source comprising the socket and the OLED blade or the OLED blade panel.

BACKGROUND OF THE INVENTION

U.S. Pat. No. 6,787,990 B2 discloses a solid-state area illumination light source including a rigid support; a flexible substrate attached to the rigid support; an organic light emitting diode (OLED) layer deposited on the flexible substrate, the organic light emitting diode layer including first and second electrodes for providing electrical power to the OLED layer; an encapsulating cover covering the OLED layer, first and second conductors electrically connected to the first and second electrodes, and extending beyond the encapsulating cover for making electrical contact to the first and second electrodes by an external power source; and a base connected to the rigid support, the base being adapted to be removably received by a socket and having first electrical contacts for making electrical connection to the first and second conductors of the light source, and second electrical contacts for making electrical connection to conductors in the socket.

The disclosed area illumination light source offers only limited flexibility.

SUMMARY OF THE INVENTION

It is an object of the present invention to provide a flexible OLED based light source which is easy to handle.

According to a first aspect a socket for electrically connecting an OLED blade is provided, the socket comprises a first part and a second part with a slot between the first part and the second part for receiving the OLED blade, at least parts of the first part or the second part being transparent such that primary light emitted by the OLED blade when inserted in the slot can pass the first part or the second part, the socket further comprises first electrical contacts for electrically contacting the OLED blade and a first mechanical fixture to attach the OLED blade in a removable way between the first part and the second part, the socket further comprising an electrical connector for supplying electrical power to the first electrical contacts. The electrical connector may be a screw base, pin contacts or cables which may be electrically connected to a corresponding connector.

The socket enables that OLEDs can be used, for example, in combination with well-known E27 or E14 screw bases. The first part and second part enclose the OLED blade comprising the OLED. The first and second part may be in fixed connection such that the first and second part cannot be separated without tools. The OLED blade comprises a planar sheet like OLED and may emit primary light with a Lambertian light distribution in one or two directions essentially perpendicular to the plane of the OLED. The OLED may be in a fixed connection with the OLED blade or may be in a removable connection. In case of a removable connection the OLED blade comprises an OLED blade panel with a seating for the OLED. The OLED blade and the OLED blade panel provide mechanical and, depending on the configuration, electrical connections between the socket and the OLED. The OLED blade is fixed by means of the first mechanical fixture of the socket. The first mechanical fixture may be the inner walls of the slot. The OLED blade may be introduced in the slot and may slide along the inner walls until a final position may be reached. In the final position an electrical connection between the OLED blade and the first electrical contacts of the socket is established. A post or the like providing a stop point during the introduction of the OLED blade may be part of the first mechanical fixture. Furthermore, one or more clamps may be part of the first mechanical fixture in order to keep the OLED blade in the final position. Alternatively or in addition, a lock or the like may avoid that the OLED blade may inadvertently slide out of the slot.

The OLED blade can be easily inserted in or taken out of the socket. This enables to replace an OLED or the OLED blade in an easy way such that, for example, a new and more efficient generation of OLEDs can be used in combination with available infrastructure as screw bases or power outlets. Furthermore, a white OLED can easily be replaced by a colored or multicolored OLED.

Depending on whether an OLED emitting light at a single side or an OLED emitting light at both sides of the planar surface of the OLED is used in the OLED blade, the first and/or the second part may be at least partly transparent. Primary light emitted by the OLED blade when inserted in the slot can thus pass the first part, the second part or both. Furthermore, the socket can be arranged in a way that the first part and/or the second part can easily be modified by replacing at least parts of the first part and/or the second part. A non-transparent first part or second part may thus be converted to a transparent first part or second part. The first part and the second part may thus be arranged in a way that parts or even the whole first part and/or second part can be detached from the socket. The latter may be especially advantageous if the first part and/or the second part comprise a secondary optic being adapted to change the light distribution of the primary light emitted by the OLED blade or to convert the primary light to secondary light when the OLED blade is inserted in the slot. The secondary optic can be exchanged such that the light distribution or the light can be adapted to the needs of a user in a flexible way. Alternatively or in addition, the first part and/or the second part comprising the secondary optic may be replaceable.

In general any kind of optical device which can be used in combination with an OLED can be used as secondary optic in the first part and/or the second part. Examples may be conventional Lenses, Fresnel lenses, phosphor sheets or holographic devices. The secondary optic should preferably be adapted to distribute or change the light of a large area light emitting device emitting light with a Lambertian light distribution.

The slot and/or the first mechanical fixture may be arranged in a way that an unambiguous electrical connection of the OLED blade is enabled. The latter may be important if the OLED blade needs direct current such that the OLED blade can only be connected in one way to the first electrical contacts of the socket in order to avoid malfunction. The slot may comprise one or more guide rails being arranged to provide an unambiguous electrical connection. Alternatively, the slot may be wider at the entrance in order to force the user to introduce the OLED blade in a defined direction. Furthermore, the first mechanical fixture may comprise a male or female connector and the OLED blade may, for example, comprise a corresponding connector such that an unambiguous connection is enabled. The male or female connector of the first mechanical fixture may comprise the first electrical contacts.

The OLED blade may be driven by direct current or by alternating current. The socket may comprise a driver to convert conventional main power to direct current if the OLED has to be driven by direct current. The driver may be in a fixed connection with the socket or may be removable. A removable driver may have the advantage that the driver can be adapted to a new OLED blade.

There are two different options with respect to the OLED blade. In a first option the OLED blade comprises an OLED, second electrical contacts and a first sliding surface, wherein the first sliding surface is adapted to slide into the slot of the socket as described above. An electrical connection is established between the first electrical contacts of the socket and the second electrical contacts of the OLED blade such that electrical power can be provided to the OLED being comprised by the OLED blade.

The OLED blade may be, for example, disc shaped and the upper and lower side of the disc may be arranged as second electrical contacts separated by means of an electrically isolating layer. The first electrical contacts may be spring contacts establishing an electrical connection between the socket and the OLED blade as soon as the OLED blade is introduced into the slot. The first sliding surface may be one or more surface of the OLED blade being arranged to support the introduction of the OLED blade into the slot. In case of the disc shaped embodiment of an OLED blade the upper and lower surface of the disc may be arranged to slide along the inner surface of the slot. Alternatively, the ring shaped side of the disc may be arranged as sliding surface which may slide into guide rails of the socket. Protrusions or notches on the surface of the OLED blade may be used as second mechanical fixtures enabling an unambiguous electrical connection of the OLED blade to the socket. The OLED blade may be round, rectangular, triangular, oval or may have any other shape which may fit into a corresponding slot of the socket. The shape of the first part and the second part may the same as the shape of the OLED blade. Alternatively, the socket may have a different shape as the OLED blade such that a rectangular OLED blade may be introduced in socket with, for example, essentially round shaped first and second parts. Secondary optics embedded in the first and/or second parts may be used to adapt the light distribution to the shape of the first part and/or second part.

In a second option the OLED blade comprises an OLED blade panel. The OLED blade panel comprises a seating for receiving an OLED. The OLED blade panel further comprises a second sliding surface being adapted to slide into the slot of the socket as described above such that an electrical connection between first electrical contacts of the socket and second electrical contacts of the OLED can be established. The OLED blade panel is an adapter between the socket and the OLED which can be placed in the seating of the OLED blade panel. The OLED blade panel provides mechanical support and depending on the configuration electrical connection between the socket and the OLED if placed in the seating. The OLED blade panel may, for example, consist of two disc shaped structures such that a, for example disc shaped OLED can be sandwiched between both disc shaped structures. The second sliding surfaces of the disc like structures may arranged in a similar way as described above with respect to first sliding surface of the disc shaped blade panel. One surface of each disc like structure may comprise second electrical contacts to establish an electrical connection between the socket and the OLED blade and the other surface of each disc like structure may comprise a third electrical contact to electrically connect the electrical contacts of the OLED such that an electrical connection can be established between the first electrical contacts of the socket and the electrical contacts of the OLED via said second and third electrical contacts. Alternatively, the seating to receive the OLED may be a recess in the OLED blade panel in which the OLED can be placed. The electrical contacts of the OLED may be used in this case to contact the first electrical contacts of the socket in a direct way. Both electrical contacts of the OLED may be arranged on one side of the OLED facing outwards if the OLED is placed in the recess of the OLED blade panel. It may also be possible that one electrical contact of the OLED is directly electrically connected to one first electrical contact of the socket, and the second electrical contact of the OLED may be electrically connected to the other first electrical contact of the socket via one second and one third electrical contact of the OLED blade panel.

A third mechanical fixture and a fourth mechanical fixture may be provided to enable an unambiguous electrical connection between the OLED received in the seating of the OLED blade panel and the socket. The fourth mechanical fixture being arranged such that an unambiguous electrical connection between the OLED blade panel and the socket is enabled similar to the second mechanical fixture described above with respect to the OLED blade. The third mechanical fixture may be arranged such that an unambiguous electrical connection between the OLED blade panel and the OLED is enabled. Both, the third and fourth mechanical fixture may be, for example, protrusion and/or notches or a combination thereof.

The OLED blade or the OLED blade panel may comprise a driver for driving the OLED. A driver embedded in the OLED blade or the OLED blade panel would have the advantage that no driver is needed in the socket. The latter may have the advantage that the driver can be adapted to the OLED if the OLED is a fixed part of the OLED blade. Alternatively, OLED blade panel and OLEDs can be combined such that the driver comprised in the OLED blade panel fits to the OLED. Thus, a flexible and optimized light source is provided.

A light source may comprise the socket as described above in combination with an OLED blade or an OLED blade panel. In case of an OLED blade panel an OLED is needed to emit light if the socket is connected to an electrical power supply.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

DETAILED DESCRIPTION OF EMBODIMENTS

Various embodiments of the invention will now be described by means of the Figures.

Figure 1:
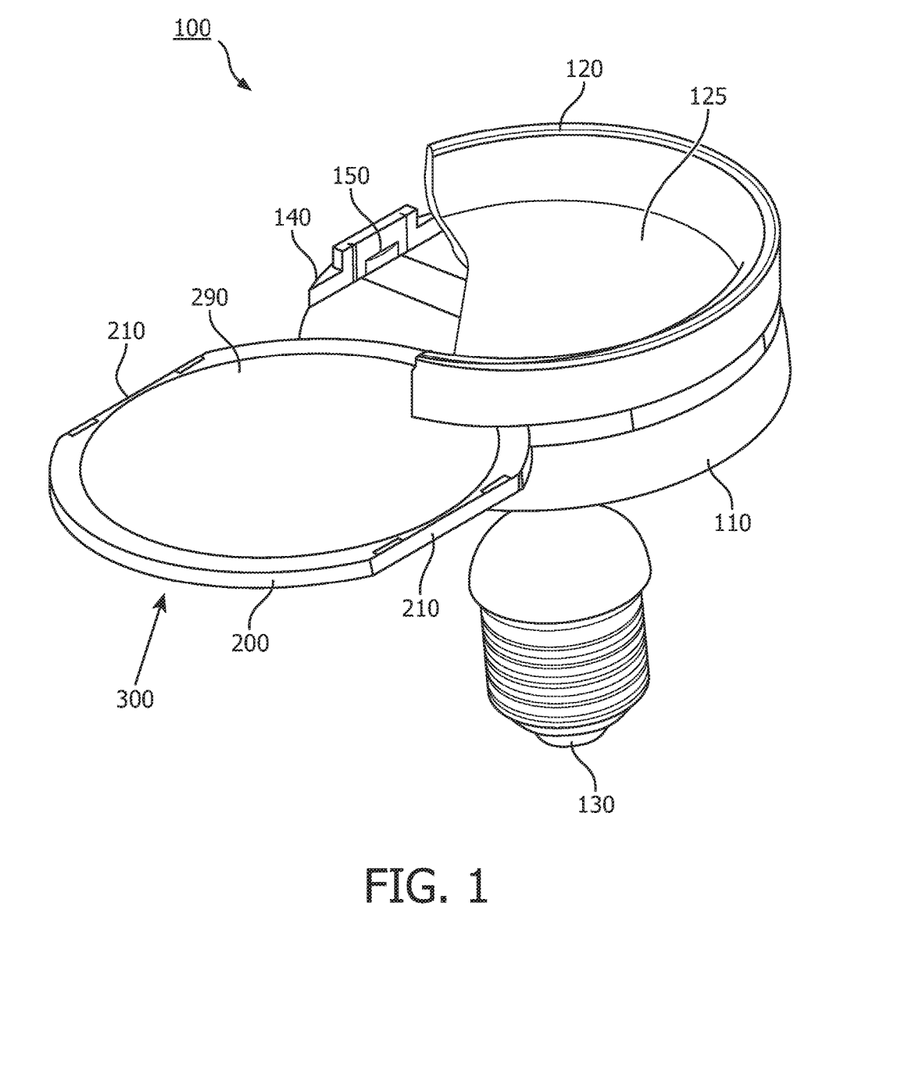
FIG. 1 shows a perspective view of a socket, an OLED blade panel and an OLED blade
Figure 2:
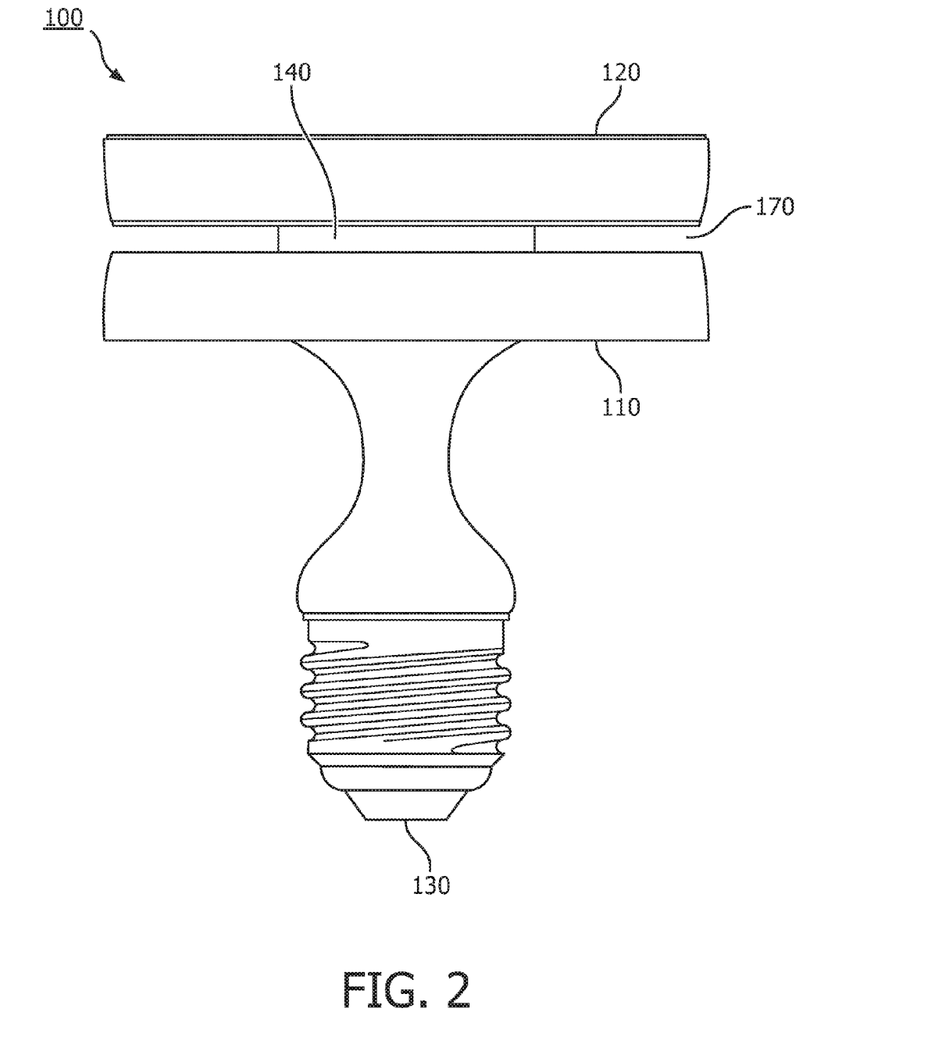
FIG. 2 shows a side view of the socket depicted in FIG. 1

The socket shown in FIG. 1 and FIG. 2 comprises an electrical connector 130, for example, an Edison E27 screw base for connecting the socket with an electrical power supply. The electrical connector 130 is connected with a first part 110 and a second part 120 with a slot 170 as shown in FIG. 2 between the first part 110 and the second part 120. The first part 110 and the second part 120 are mechanically connected by means of a first mechanical fixture 140. The first mechanical fixture 140 is arranged in a way that an OLED blade 300 comprising an OLED blade panel 200 and an OLED 290 can slide along the mechanical fixture 140 until second electrical contacts 210 of the OLED blade panel 200 come into contact with first electrical contacts 150 of the socket 100 which are embedded in the mechanical fixture 140. The second part 120 is at least partly transparent and comprises in this embodiment a first secondary optic 125, a converging or diverging lens. The first secondary optic 125 may be detachable such that the converging or diverging lens may be replaced, for example, by a holographic optical device providing a lighting pattern.

Figure 3:
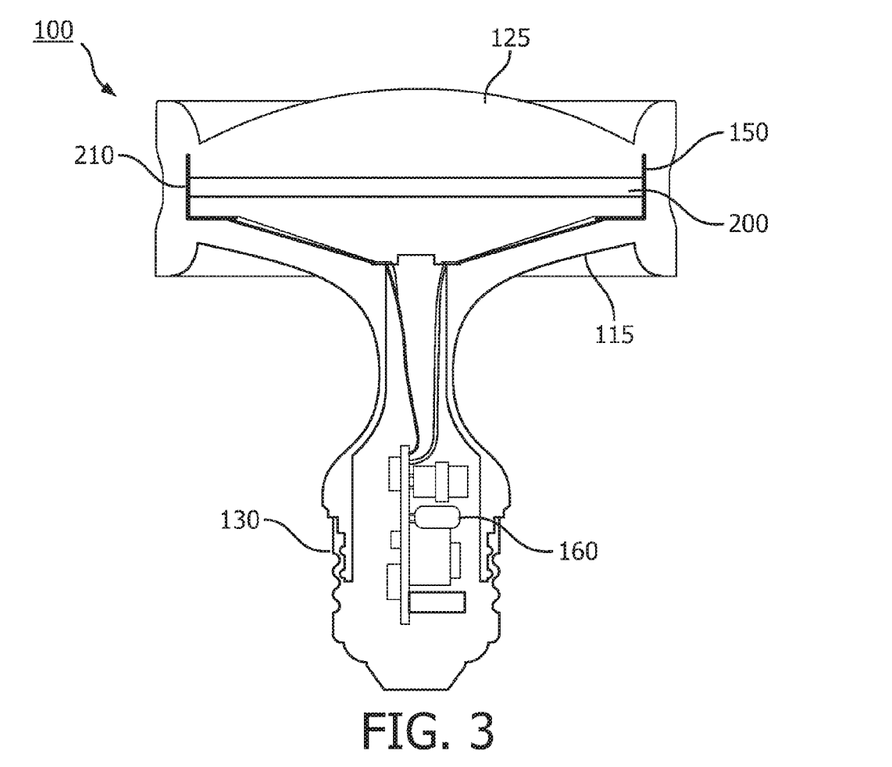
FIG. 3 shows a cross section of the socket depicted in FIG. 1

FIG. 3 shows a cross section of the socket 100 and the OLED blade panel depicted in FIGS. 1 and 2. A driver 160 is embedded in the electrical connector 130 for adapting the voltage provided by the electrical power supply (not shown) to the driving voltage of the OLED 290 (not shown). The driver 160 is electrically connected to the first electrical contacts 150. The OLED blade panel 200 is inserted in the slot 170 and electrically connected via the second electrical contacts 210 and the first electrical contacts 150 such that the OLED 290 (not shown) can be driven by means of, for example, ordinary alternating current provided by the power supply. Primary light emitted by the OLED blade is distributed by means of the first secondary optic 115 and second secondary optic 125. The first secondary optic 115 and the second secondary optic 125 may be, for example, lenses or any other optical device to redistribute or convert the primary light emitted by the OLED blade. The first and/or second secondary optic may comprise phosphors or the like in order to convert, for example, white primary light to colored secondary light. The first and the second secondary optic may be detachable.

Figure 4:
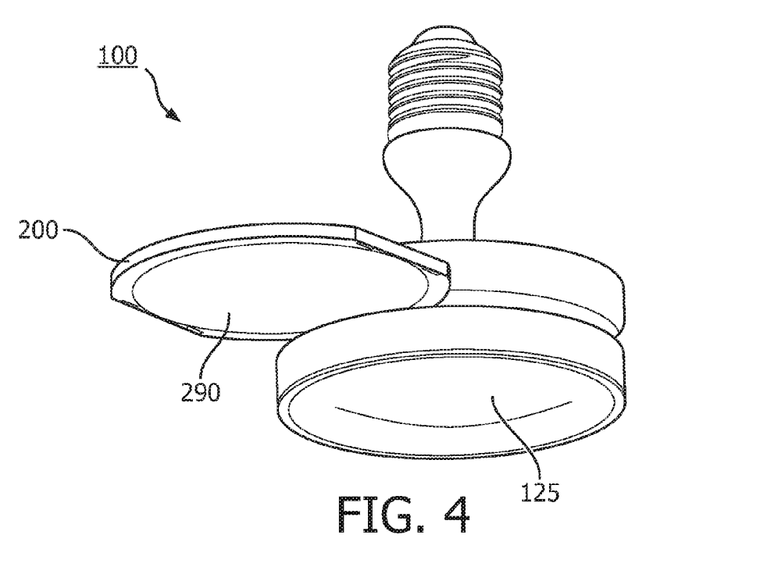
FIGS. 4 and 5 show further perspective views of the socket, OLED blade panel and OLED blade depicted in FIG. 1
Figure 5:
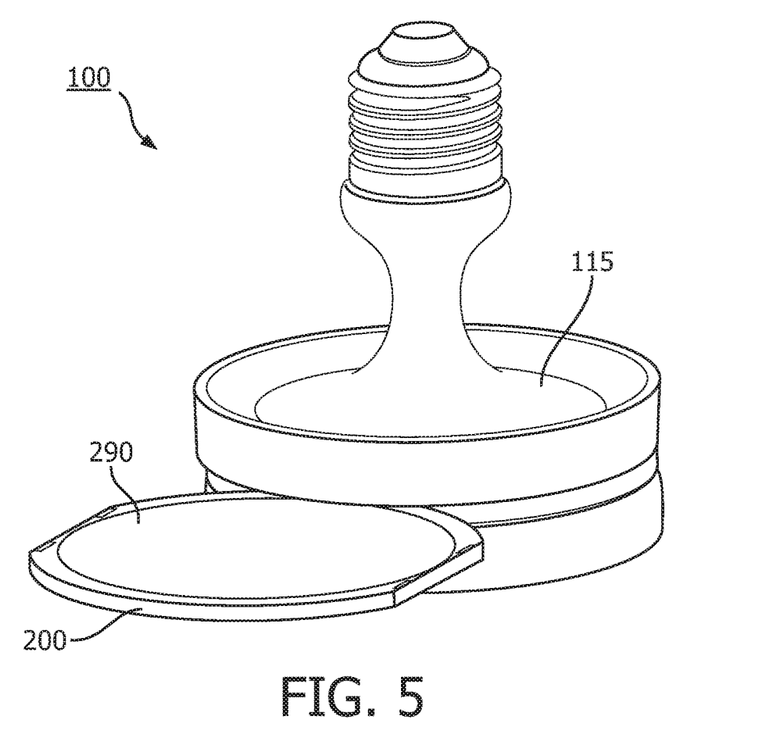

FIGS. 4 and 5 show further perspective views of the socket 100, the OLED blade panel 200 and the OLED 290 showing more details of the first secondary optic 115 and the second secondary optic 125.

Figure 6:
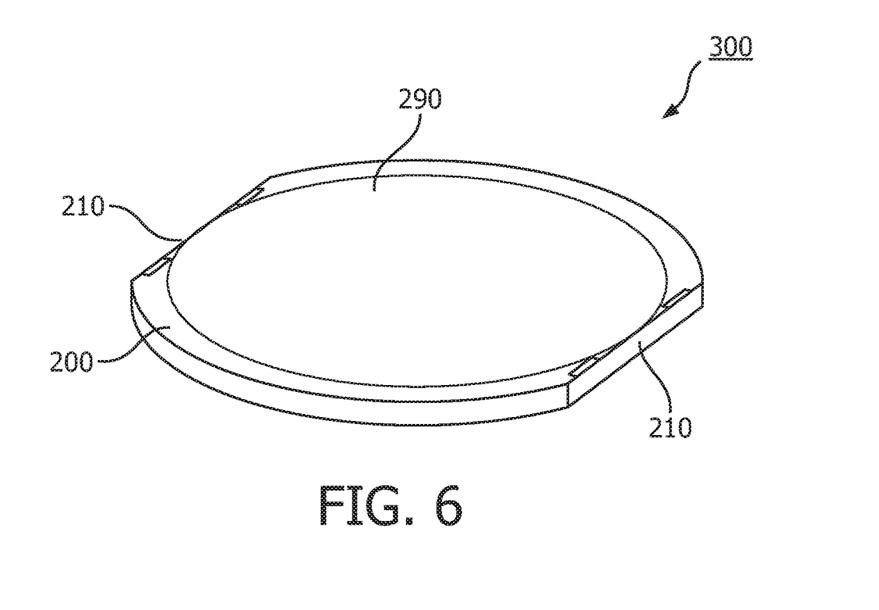
FIG. 6 shows a perspective view of an OLED blade panel and OLED blade
Figure 7:
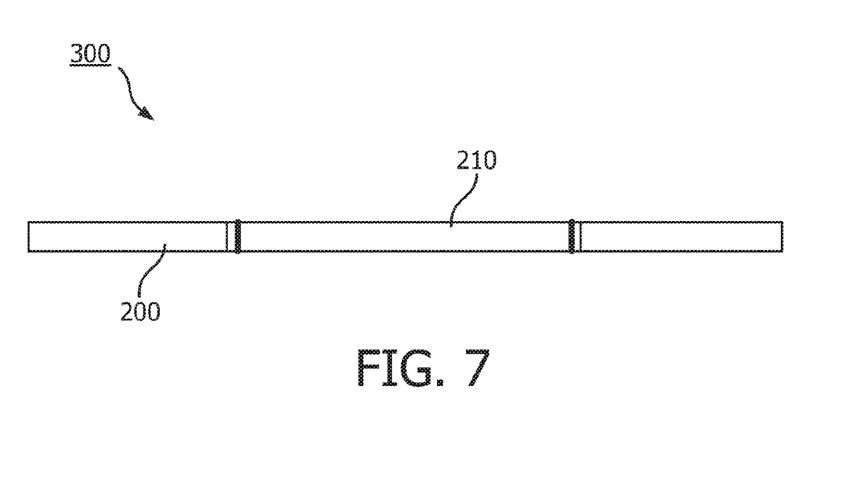
FIG. 7 shows a side view of an OLED blade panel

FIGS. 6 and 7 show an enlarged view of the OLED blade panel 200, second electrical contacts 210 and the OLED 290.

Figure 8:
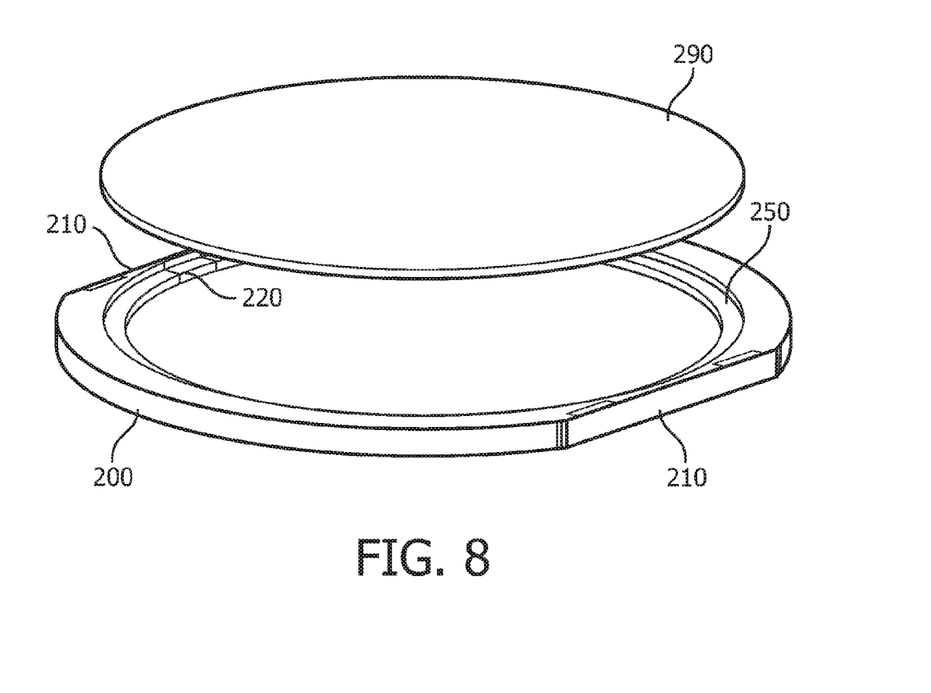
FIG. 8 shows a explosive view of an OLED blade panel and OLED blade

In FIG. 8 the OLED 290 is separated from the OLED blade panel such that a seating 250 for receiving the OLED 290 is visible. Furthermore, third electrical contacts 220 are shown which are adapted to contact the electrical contacts of the OLED 290 (not shown) if the OLED 290 is placed in the seating 250.

Figure 9:
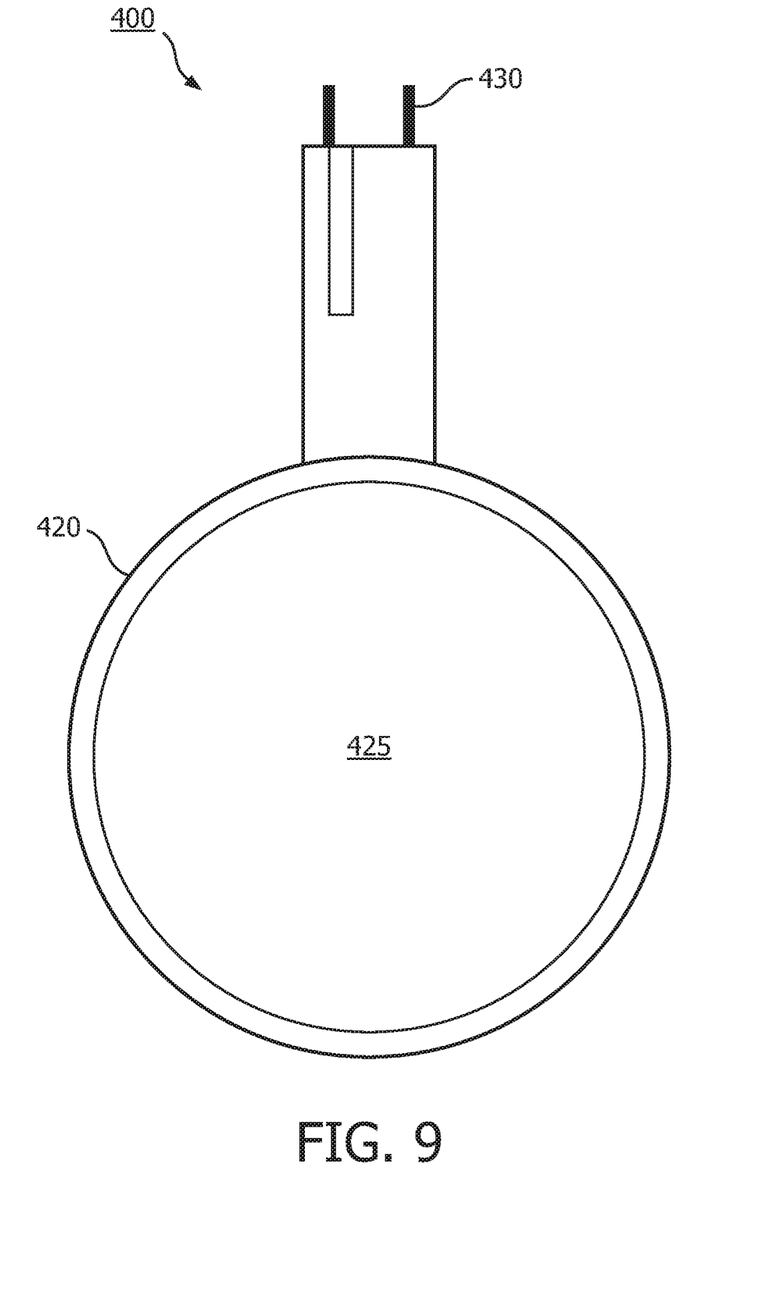
FIG. 9 shows another embodiment of a socket
Figure 10:
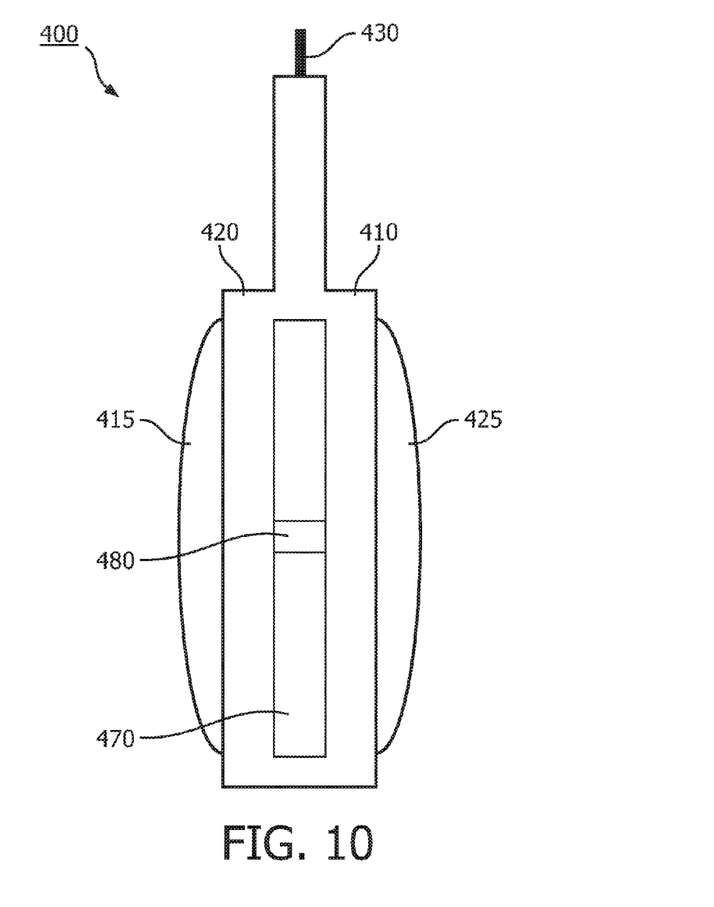
FIG. 10 shows a rotated view of the socket depicted in FIG. 9

FIGS. 9 and 10 show a further embodiment of a socket 400. The electrical connector 430 of the socket 400 comprises pin contacts. The first part 410 and the second part 420 are now aligned with respect to the electrical connector 430. The primary light emitted by the OLED blade 300 is thus not directed to the electrical connector by means of the first secondary optic 415 and away from the electrical connector 430 by means of the second secondary optic 425 as in the embodiment shown in FIGS. 1 to 5. The socket 400 may thus be used to illuminate walls by providing e.g. a cone like light pattern.

Figure 11:
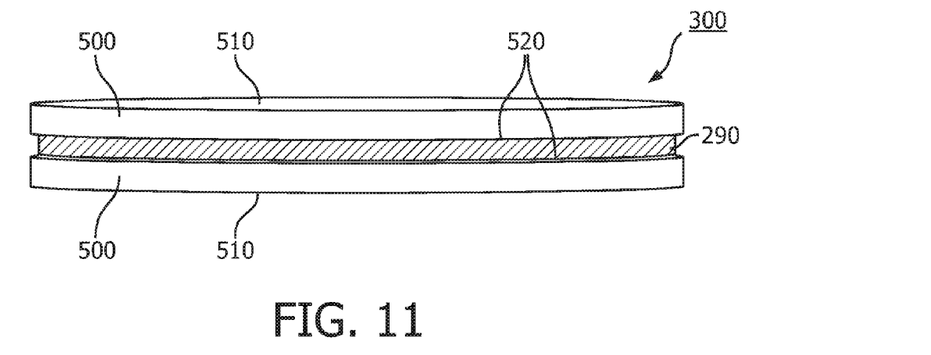
FIG. 11 shows a perspective view of another embodiment of an OLED blade panel and OLED blade

An OLED blade panel 500 as shown in FIG. 11 can be placed in the slot 470 until the post 480 is reached. The OLED blade panel 500 comprises two disc shaped structures such that an OLED 290 can be sandwiched between the two disc shaped structures. Each of the two disc shaped structures comprises outer second electrical contacts 510 for connecting the OLED blade panel 500 to the socket 400 and inner third electrical contacts 520 for connecting the OLED 290.

Figure 12:
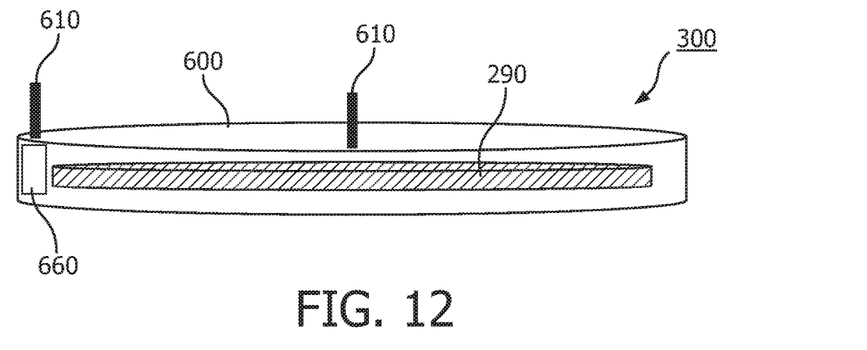
FIG. 12 shows a perspective view of another embodiment of an OLED blade panel and OLED blade
Figure 13:
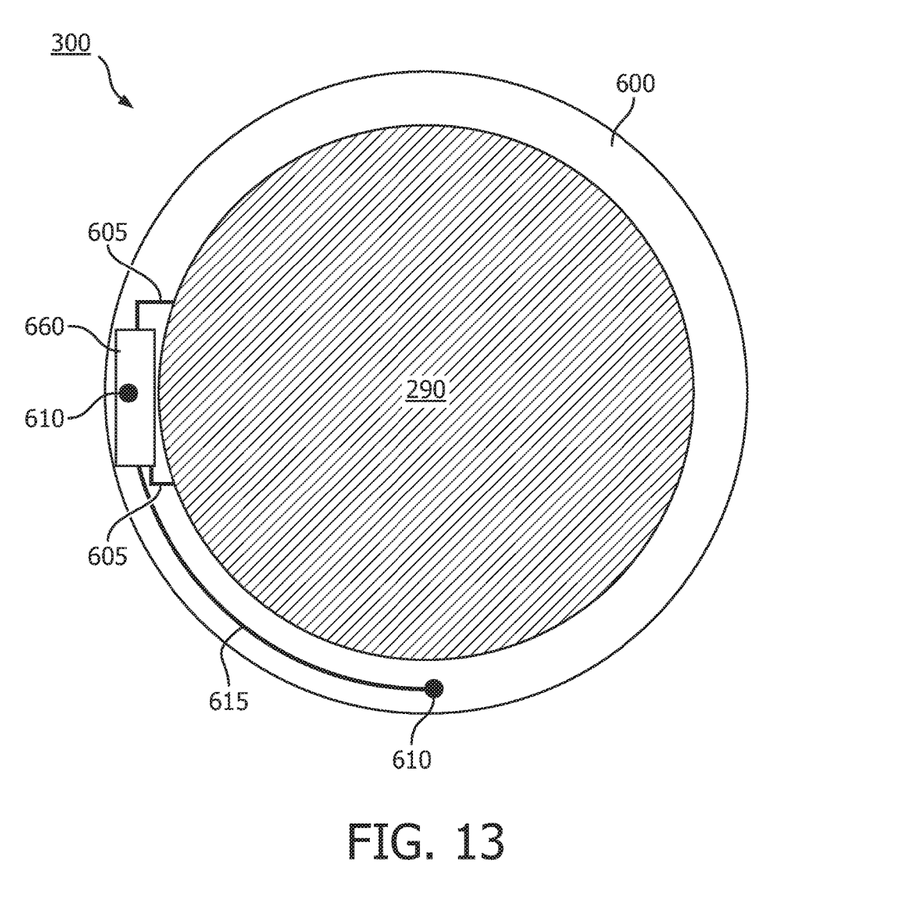
FIG. 13 shows a top view of the OLED blade panel and OLED blade depicted in FIG. 12

FIGS. 12 and 13 show a further embodiment of the OLED blade panel 600. The OLED blade panel 600 comprises second electrical contacts 610 for connecting the OLED blade 300 to the socket. The second electrical contacts 610 are pin contacts being electrically connected by means of connection cables 615 to a driver 660 embedded in the OLED blade panel 600. The driver 660 is arranged in a way that it can be directly connected to a primary power supply (e.g. 240 V AC) such that the socket used in combination with OLED blade panel 600 may not comprise a driver as depicted in FIG. 3. The OLED 290 is embedded in the OLED blade panel 600 and electrically connected to the driver 660 by means of connection cables 605 and third electrical contacts (not shown). The contact pins of the second electrical contacts are arranged in a way that the OLED blade panel can only be inserted in one unambiguous way in the corresponding slot of the socket. The contact pins thus act as second mechanical fixtures.

The OLED blade panel may offer the opportunity to use different OLEDs in one socket. A defective or outdated OLED can be exchanged in an easy way. In a similar way an OLED blade comprising and OLED being in a fixed connection with the OLED blade may also be replaced by another OLED blade. The OLED blade panel may comprise similar or identical mechanical and electrical means as provided by the OLED blade. In case of an OLED blade panel it may be necessary to provide a mechanical fixture such that the OLED which can be detached can only be inserted in the seating of the OLED blade panel in one unambiguous way. The combination of the OLED blade and the socket as described above provides a flexible light source which can be used in combination with an available electrical infrastructure.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 100, 400 socket
110, 410 first part
115, 415 first secondary optic
120, 420 second part
125, 425 second secondary optic
130, 430 electrical connector
140 first mechanical fixture
150 first electrical contacts
160 driver
170, 470 slot
200, 500, 600 OLED blade panel
210, 510, 610 second electrical contacts
220, 520 third electrical contacts
250 seating
290 OLED
300 OLED blade
480 post
605 connection cable
615 connection cable
660 driver

The invention claimed is:

1. A socket for electrically connecting an OLED blade, the socket comprising:
   a first part and a second part with a slot between the first part and the second part for receiving the OLED blade, whereas the first and second parts are mechanically connected via a first mechanical fixture forming the inner walls of the slot, with at least parts of the first part or the second part being transparent such that primary light emitted by the OLED blade when inserted in the slot can pass the first part or the second part;
   the socket further comprising first electrical contacts for electrically contacting the OLED blade and the first mechanical fixture to attach the OLED blade in a removable way between the first part and the second part, the socket further comprising an electrical connector for supplying electrical power to the first electrical contacts and where the first electrical contacts are embedded in the first mechanical fixture along the inner walls of the slot;
   wherein at least one of the first part or the second part comprises a secondary optic being adapted to change the light distribution of the primary light emitted by the OLED blade when inserted in the slot.

2. The socket according to claim 1, wherein at least parts of the first part and the second part are transparent such that the primary light emitted by the OLED blade when inserted in the slot can pass the first part and the second part.

3. The socket according to claim 2, wherein the first part comprises a first secondary optic and the second part comprises a second secondary optics both being adapted to change the light distribution of the primary light emitted by the OLED blade when inserted in the slot.

4. The socket according to claim 1, wherein the slot and/or the first mechanical fixture are arranged such that an unambiguous electrical connection of the OLED blade is enabled.

5. The socket according to claim 1, wherein the secondary optic in the first part and/or the second part is a conventional Lens, a Fresnel lens, or a holographic device.

6. The socket according to claim 1, wherein the secondary optic can be detached from the first part and/or the second part.

7. The socket according to claim 1, the socket comprising a driver for driving the OLED blade.

8. An OLED blade comprising an OLED with electrical contacts, second electrical contacts being connected to the electrical contacts of the OLED and a first sliding surface, the first sliding surface being adapted to slide into a slot of a socket as claimed in claim 1 such that an electrical connection between the first electrical contacts embedded in the first mechanical fixture along the inner walls of the slot of the socket and the second electrical contacts of the OLED blade can be established.

9. The OLED blade according to claim 8, the OLED blade further comprising a second mechanical fixture, the second mechanical fixture being arranged such that an unambiguous electrical connection of the OLED blade to the socket is enabled.

10. The OLED blade according to claim 8 where the second electrical contacts are arranged along the side of the OLED blade facing outward.

11. An OLED blade panel comprising a seating for receiving an OLED blade, the OLED blade comprising an OLED with electrical contacts, second electrical contacts being connected to the electrical contacts of the OLED and a first sliding surface, the OLED blade panel further comprising a second sliding surface being adapted to slide into a slot of a socket as claimed in claim 1 such that an electrical connection between first electrical contacts embedded in the first mechanical fixture along the inner walls of the slot of the socket and second electrical contacts of the OLED blade can be established.

12. The OLED blade panel according to claim 11 further comprising a third mechanical fixture and a fourth mechanical fixture, the third mechanical fixture being arranged such that an unambiguous electrical connection of the OLED and the OLED blade panel is enabled, and the fourth mechanical fixture being arranged such that an unambiguous electrical connection of the OLED blade panel and the socket is enabled.

13. The OLED blade panel according to claim 12 further comprising a driver for driving the OLED.

14. A light source comprising the socket according to claim 1.

15. A light source comprising the socket according to claim 1 and the OLED blade panel according to claim 11.

* * * * *